United States Patent
Ganti et al.

(10) Patent No.: US 11,200,403 B2
(45) Date of Patent: Dec. 14, 2021

(54) NEXT LOCATION PREDICTION

(71) Applicant: INTERNATIONAL BUSINESS MACHINES CORPORATION, Armonk, NY (US)

(72) Inventors: Raghu K. Ganti, Elmsford, NY (US); Norbert Herman, Denver, CO (US); Shubhadip Ray, Secaucus, NJ (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 804 days.

(21) Appl. No.: 15/141,484

(22) Filed: Apr. 28, 2016

(65) Prior Publication Data
US 2017/0318430 A1 Nov. 2, 2017

(51) Int. Cl.
G06K 9/00 (2006.01)
G06Q 30/00 (2012.01)
(Continued)

(52) U.S. Cl.
CPC ....... G06K 9/00221 (2013.01); G06K 9/6218 (2013.01); G06K 9/6269 (2013.01);
(Continued)

(58) Field of Classification Search
CPC ............. G06K 9/00221; G06K 9/6284; G06K 9/6269; G06K 9/6218; G06Q 30/0261; G06Q 30/0204; H04W 4/029
See application file for complete search history.

(56) References Cited

U.S. PATENT DOCUMENTS

| | | | |
|---|---|---|---|
| 8,700,230 B1 | 4/2014 | Hannah et al. | |
| 2008/0249870 A1* | 10/2008 | Angell | G06Q 30/0269 705/14.53 |

(Continued)

OTHER PUBLICATIONS

Du, Y., Wang, C., Qiao, Y., Zhao, D., & Guo, W. (2018). A geographical location prediction method based on continuous time series Markov model. PloS one, 13(11), e0207063. https://doi.org/10.1371/journal.pone.0207063 (Year: 2018).*

(Continued)

Primary Examiner — Rutao Wu
Assistant Examiner — Tyrone E Singletary
(74) Attorney, Agent, or Firm — Tutunjian & Bitetto, P.C.; Vazken Alexanian (57) ABSTRACT

A method and system are provided for next location prediction. The method includes inferring, by a hardware processor, a store layout, based on user location data and user transaction data for a plurality of users. The method further includes clustering, by the hardware processor, the plurality of users based on the user transaction data to form a set of clusters. The method also includes ensembling, by the hardware processor, users within each of the clusters and building a location prediction model for each of the clusters. The method additionally includes predicting, by the hardware processor, a next location of a particular user from the plurality of users based on a weighted vote taken over the location prediction model for the cluster corresponding to the particular user. The cluster corresponding to the particular user includes at least one other user from the plurality of users in addition to the particular user.

16 Claims, 7 Drawing Sheets

(51) Int. Cl.
*G06Q 30/02* (2012.01)
*G06K 9/62* (2006.01)
*H04W 4/029* (2018.01)

(52) U.S. Cl.
CPC ....... *G06K 9/6284* (2013.01); *G06Q 30/0204* (2013.01); *G06Q 30/0261* (2013.01); *H04W 4/029* (2018.02)

(56) References Cited

U.S. PATENT DOCUMENTS

| | | | |
|---|---|---|---|
| 2009/0024546 A1* | 1/2009 | Ficcaglia | G06F 16/9535 706/12 |
| 2009/0089107 A1* | 4/2009 | Angell | G06Q 10/00 705/7.28 |
| 2013/0030994 A1 | 1/2013 | Caiman et al. | |
| 2014/0128105 A1* | 5/2014 | Su | H04W 4/029 455/456.3 |
| 2014/0236695 A1 | 8/2014 | Shvarts et al. | |
| 2014/0279294 A1 | 9/2014 | Field-Darragh et al. | |
| 2014/0304033 A1 | 10/2014 | Cardno et al. | |
| 2015/0051953 A1* | 2/2015 | Howe | G06Q 30/0205 705/7.34 |
| 2015/0161665 A1* | 6/2015 | Grimes | G06Q 30/0261 705/14.53 |
| 2015/0278888 A1 | 10/2015 | Lu et al. | |
| 2016/0034924 A1* | 2/2016 | Sorenson | H04W 4/02 705/7.29 |
| 2016/0321551 A1* | 11/2016 | Priness | G06Q 10/00 |

OTHER PUBLICATIONS

E. H. Lu, V. S. Tseng and P. S. Yu, "Mining Cluster-Based Temporal Mobile Sequential Patterns in Location-Based Service Environments," in IEEE Transactions on Knowledge and Data Engineering, vol. 23, No. 6, pp. 914-927, Jun. 2011 (Year: 2011).*

Anonymous, "Method to Provide Shopping Recommendations Based on Cross-store Shopping History of Consumer", An IP.com Prior Art Database Technical Disclosure, IP.com No. IPCOM000232566D, Nov. 2013, 3 pages.

* cited by examiner

FIG. 7

NEXT LOCATION PREDICTION

BACKGROUND

Technical Field

The present invention generally relates to information management, and more particularly to generating a next location prediction for a user.

Description of the Related Art

Widespread availability of location data has prompted its use in various e-commerce applications for determining a next-best-action (e.g., predictively send a coupon/advertisement to the customer). This involves building models on user's indoor/outdoor location data besides other modes of interaction (e.g., past purchases (e.g., online and brick and mortar store, store application on smartphone, and so forth)). One of the basic constructs used in this setting is that of a next location prediction (e.g., predict the customer's next location in a retail store given the current (and past) locations visited by a customer, predict the expected time of arrival to the next location, and so forth).

However, past approaches to next location prediction suffer some deficiencies including, but not limited to, accuracy. Thus, there is a need for an improved approach for next location prediction.

SUMMARY

According to an aspect of the present principles, a method is provided for next location prediction. The method includes inferring, by a hardware processor, a store layout, based on user location data and user transaction data for a plurality of users. The method further includes clustering, by the hardware processor, the plurality of users based on the user transaction data to form a set of clusters. The method also includes ensembling, by the hardware processor, users within each of the clusters and building a location prediction model for each of the clusters. The method additionally includes predicting, by the hardware processor, a next location of a particular user from the plurality of users based on a weighted vote taken over the location prediction model for the cluster corresponding to the particular user. The cluster corresponding to the particular user includes at least one other user from the plurality of users in addition to the particular user.

According to another aspect of the present principles, a system is provided for next location prediction. The system includes a hardware processor, configured to infer a store layout, based on user location data and user transaction data for a plurality of users. The hardware processor is further configured to cluster the plurality of users based on the user transaction data to form a set of clusters. The hardware processor is also configured to ensemble users within each of the clusters and build a location prediction model for each of the clusters. The hardware processor is additionally configured to predict a next location of a particular user from the plurality of users based on a weighted vote taken over the location prediction model for the cluster corresponding to the particular user. The cluster corresponding to the particular user includes at least one other user from the plurality of users in addition to the particular user.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to generating a next location prediction for a user.

In an embodiment, the present principles provide a method and system for building a privacy-aware next location prediction model that combines customer transaction data (e.g., retail store purchases, virtual store browsing through a smartphone application, and/or so forth) and customer location data (e.g., from WIFI hotspots, and/or so forth). This enables a co-clustering based solution spanning both the transaction data and the location data that simultaneously allows privacy protection with a relatively small penalty on model complexity (size) and accuracy. In essence, this approach captures customer preference/intent into the next location prediction model.

In an embodiment, the present principles fuse mobility data, transaction data and application interaction data. In an embodiment, mobility data and transaction data are used to infer and update a store layout (use intersections on mobility data and transaction data across multiple users). In an embodiment, mobility data is semantically enriched with store products hosted at that location. In an embodiment, users are iteratively clustered by transaction data, ensemble location models are built across all the users in a cluster, outliers are detected, and the process is repeated until convergence or a resource limit is reached. In an embodiment, mobile application interaction data is used for inference of customer intent. In an embodiment, the next location of a user is predicted based on user intent and historical location models.

Figure 1:
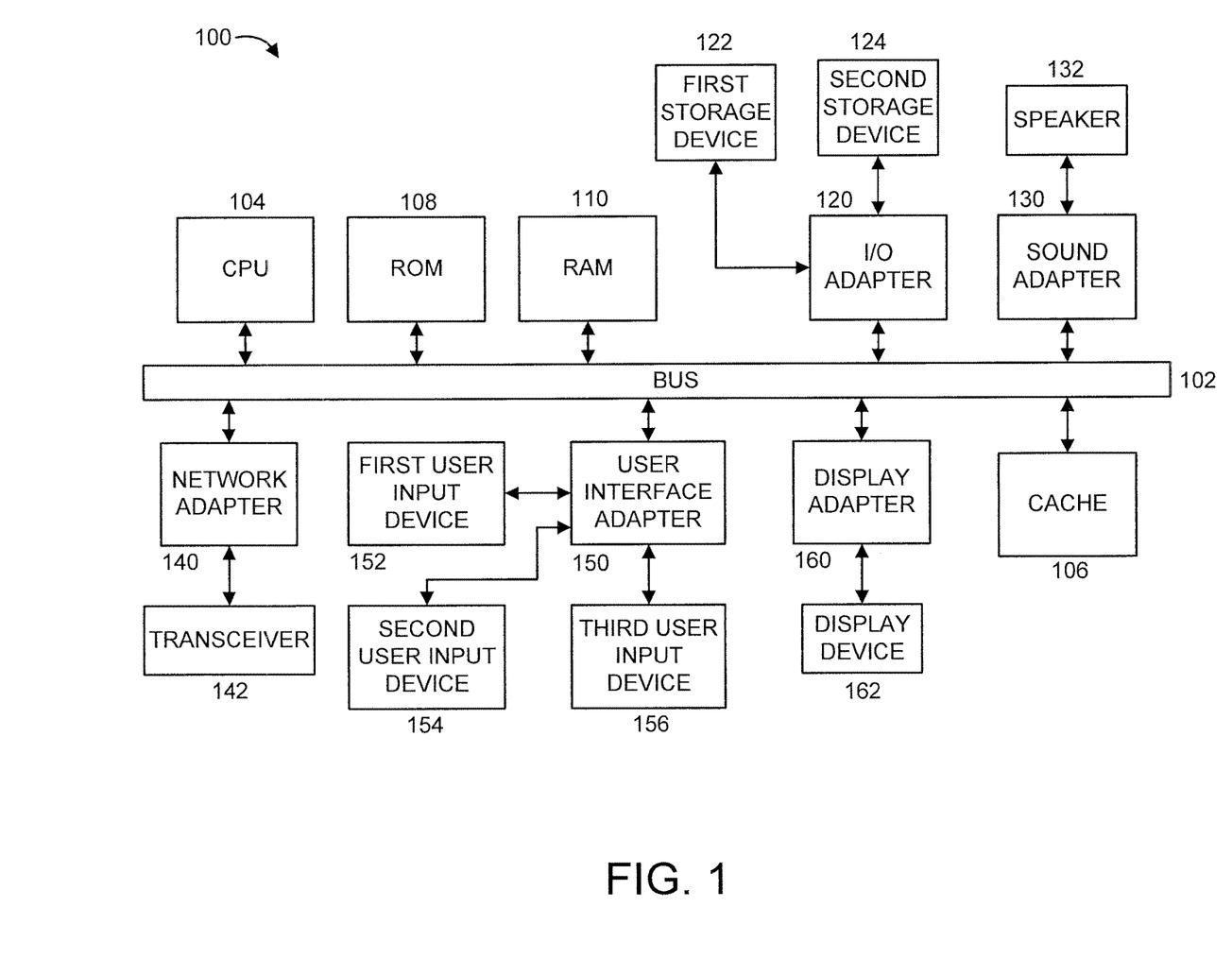
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
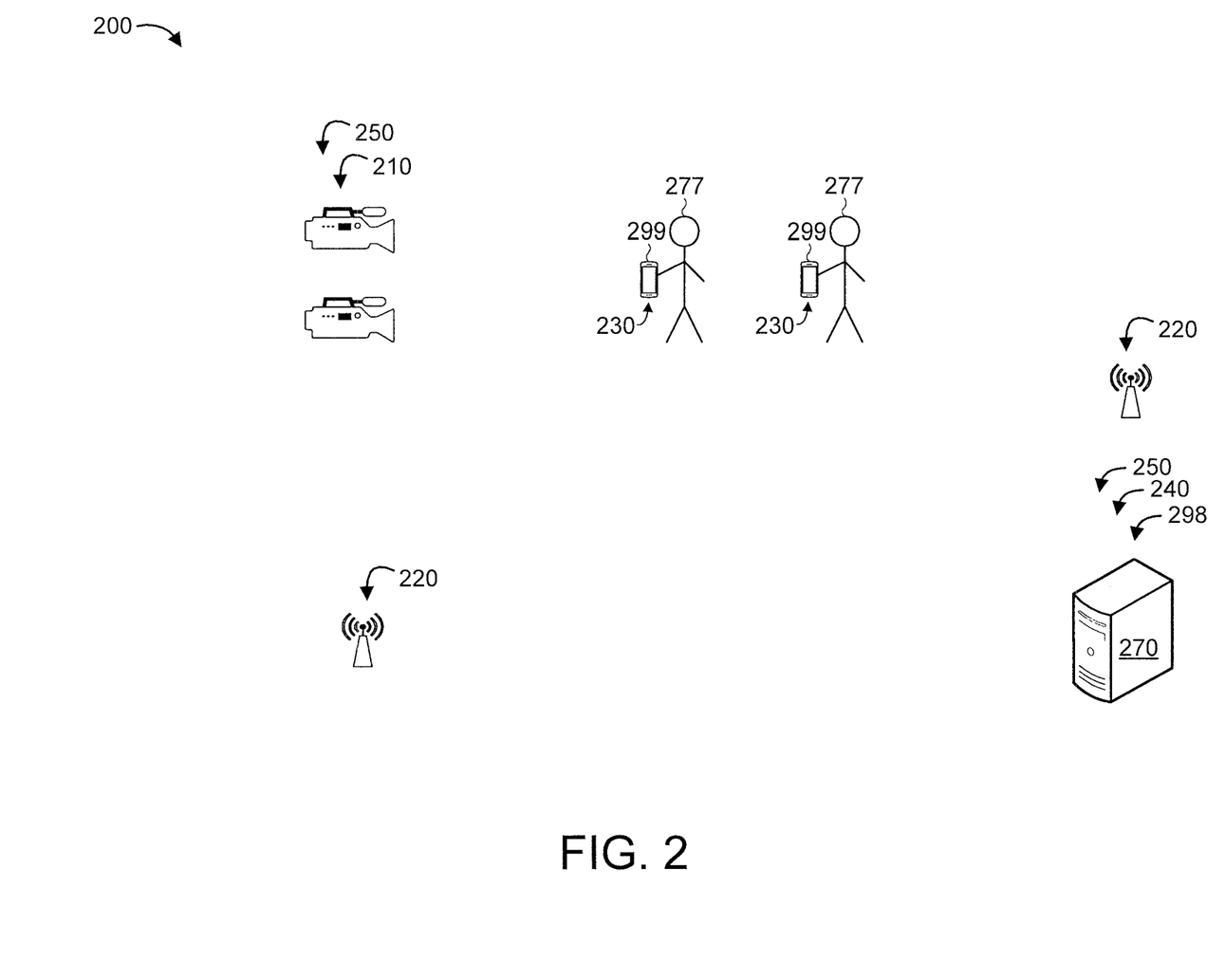
FIG. 2 shows an exemplary system for generating a next location prediction for a set of customers, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
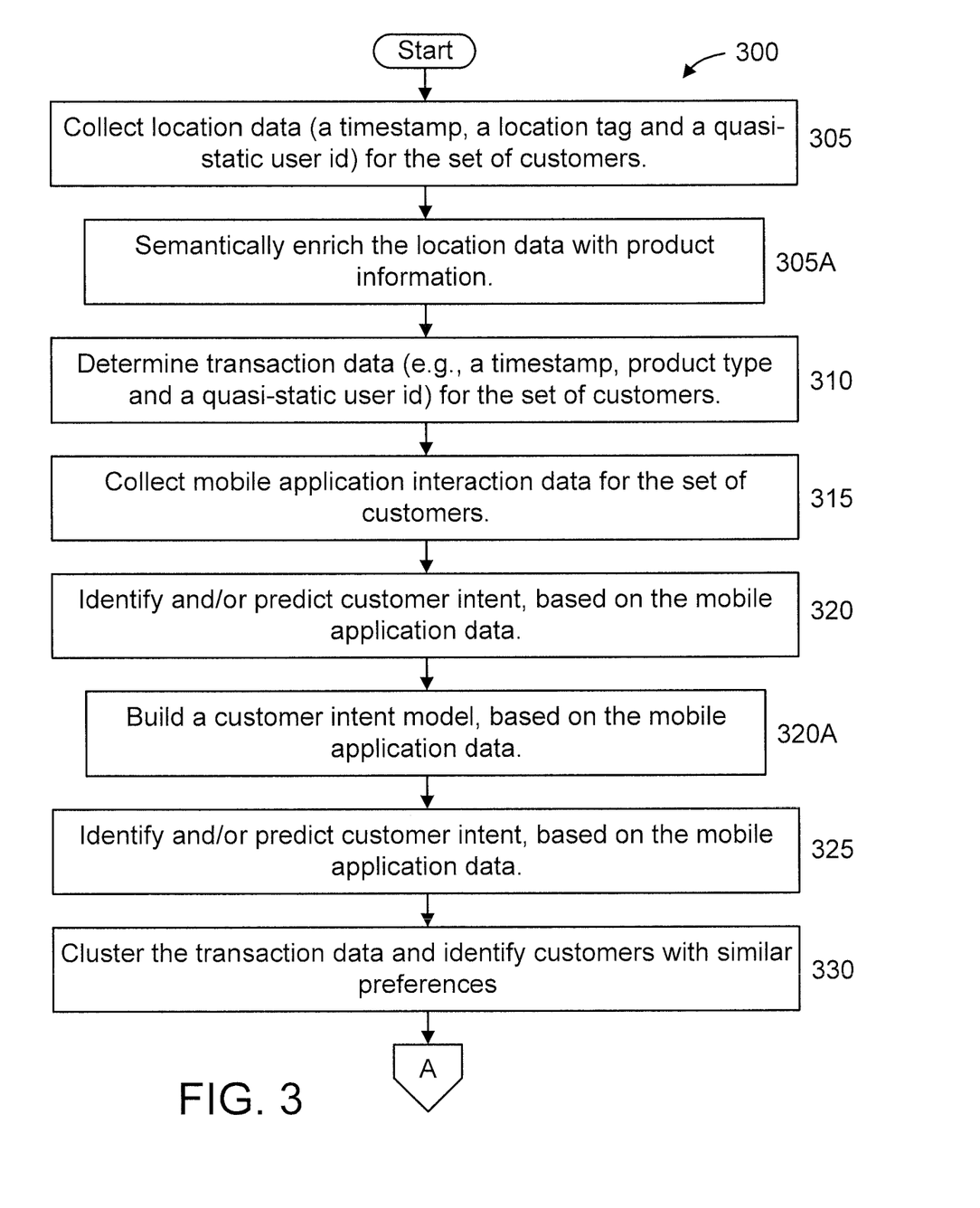
FIGS. 3-5 show an exemplary method for generating a next location prediction for a set of customers, in accordance with an embodiment of the present principles.
Figure 4:
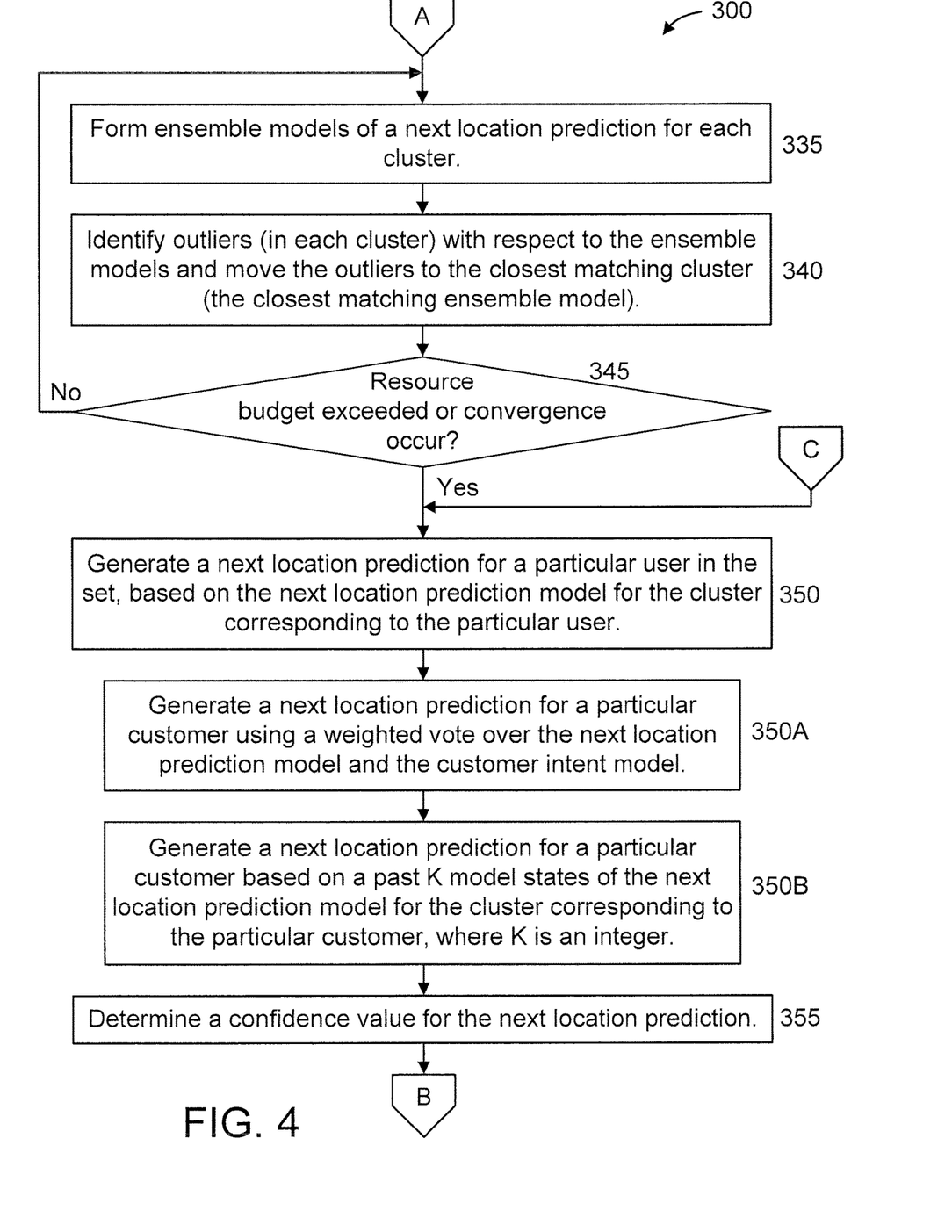
Figure 5:
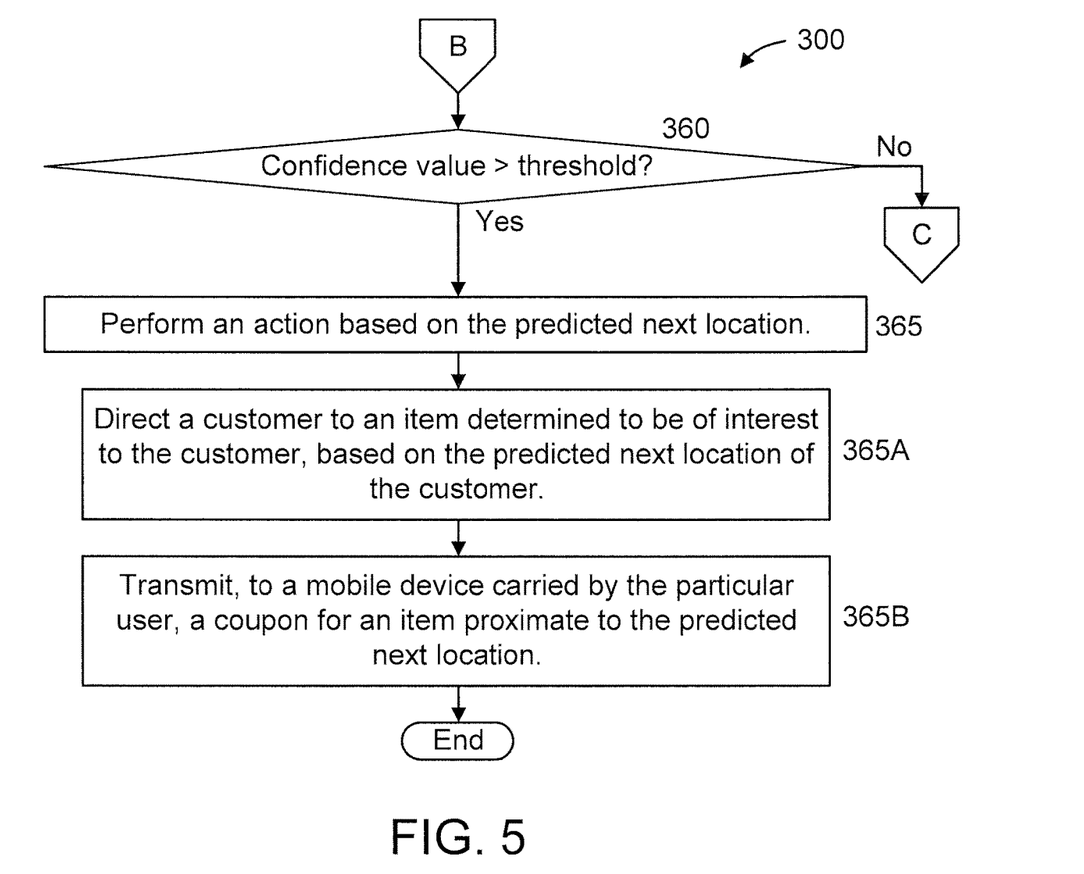

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

In the embodiments of FIG. 2 and FIGS. 3-5, the corresponding system and method thereof are applied to a set of users that are customers of a given store. Hence, the terms "user" and "customer" are used interchangeably herein. However, the present principles can be applied to any user in any setting, as readily appreciated by one of ordinary skill in the art, given the teachings of the present principles provided herein.

Moreover, in the embodiment of FIG. 2 and FIGS. 3-5, the next location prediction pertains to a next predicted location in a store. However, the present principles can be applied to generate a next location prediction relative to any location/establishment, as readily appreciated by one of ordinary skill in the art, given the teachings of the present principles provided herein.

FIG. 2 shows an exemplary system 200 for generating a next location prediction for a set of customers, in accordance with an embodiment of the present principles.

The system 200 includes a set of cameras 210, a set of WIFI access points 220, a shopping incentive providing application 230, an in-store analytics system 240, and a facial recognition system 250.

The system 200 can interface with customer mobile devices 299.

The cameras 210 capture/collect images of customers 277 entering a store.

The WIFI access points 220 detects customer mobile signals and collects customer in-store behavior.

The data collected by the system 200 (e.g., by the cameras 210 and WIFI access points 220) can be considered customer behavior patterns.

The in-store analytics system 240 analyzes the customer behavior patterns to determine a set of cross-functional use cases therefrom and provide customer behavior analytics. In an embodiment, the in-store analytics system 240 is implemented by a server 270. In an embodiment, for a given customer, the system retrieves a customer's record based on a customer identifier, where that record is used (e.g., fused and/or otherwise combined) with recently collected customer behavior patterns to determine the set of cross-functional use cases therefrom. In an embodiment, for a given customer, the customer identifier can be the customer's email address that the customer provides (via their mobile device 299) when the customer enters the store or that is retrieved when the customer is detected entering the store (e.g., by applying facial recognition using the facial recognition system 250).

The analytics and/or items derived/obtained therefrom (e.g., customer incentives) can be used for various objectives including, but not limited to, increasing overall sales, increasing opt-ins, optimizing operations, and so forth.

Regarding increasing overall sales, the present principles can accomplish the same based on various value drivers including, but not limited to: purchase conversions; order value; store traffic; and so forth. Various metrics are capable of being collected by system 200 and used to increase overall sales. Metrics relating to value drivers for purchase conversions include, but are not limited to: percentage of shoppers making a quick exit (e.g., after a few or threshold number of minutes, etc.); percentage of shoppers who complete a transaction; and so forth. Metrics relating to value drivers for order value include, but are not limited to: average order size; and so forth. Metrics relating to value drivers for store traffic include, but are not limited to: time spent in store; time between store visits; percentage of store visitors that return; and so forth.

Regarding increasing opt-ins, the present principles can accomplish the same based on various drivers including, but not limited to: WIFI connections; presence zones opt-ins; and so forth. Various metrics are capable of being collected by system 200 and used to increase opt-ins. Metrics relating to value drivers for WIFI connections include, but are not limited to: percentage of shoppers with WIFI enabled; percentage of shoppers connected to WIFI; and so forth. Metrics relating to value drivers for presence zones opt-ins include, but are not limited to: percentage of shoppers who opted-in for promotions; and so forth.

Regarding optimizing operations, the present principles can accomplish the same based on various value drivers including, but not limited to: store traffic monitoring; store configuration; store staffing; returns; and so forth.

The shopping incentive providing application 230 connects to the customer mobile devices 299 and a store application 298 and provides shopping incentives to the customers (e.g., coupons for a product near a customer, etc.). The shopping incentive providing application 230 and the store application 298 can be provided by the server 270. The incentives are determined based on the results (provide customer behavior analytics) of the in-store analytics system 240. In an embodiment, the incentives are provided further based on customers' current in-store locations as the customers travel through the store.

The facial recognition system 250 recognizes customers based on their facial features. The identification can then be used to retrieve a record corresponding to the customer and/or to provide the customer with incentives based on the next location prediction and/or so forth. The facial recognition system 250 can be provided by the server 270 and the cameras 210.

Figure 6:
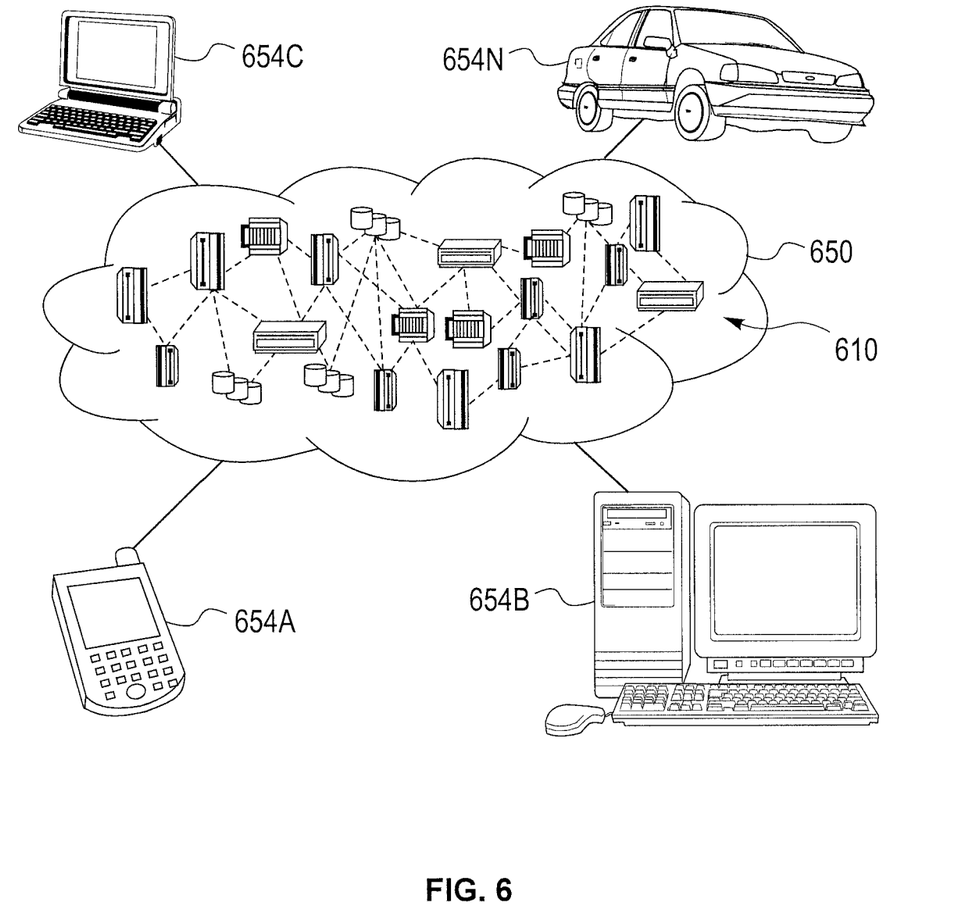
FIG. 6 shows an exemplary cloud computing environment, in accordance with an embodiment of the present principles.
Figure 7:
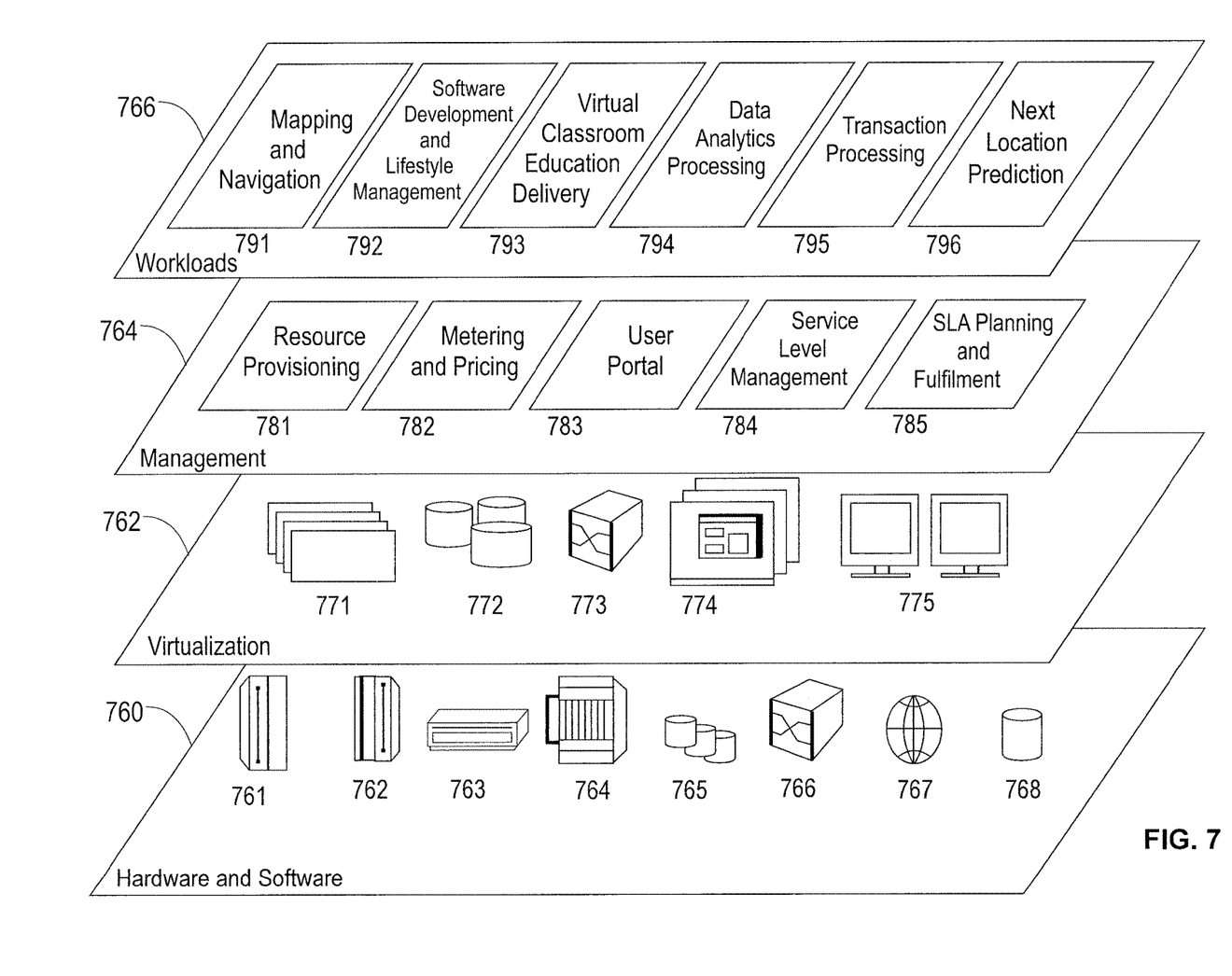
FIG. 7 shows an exemplary set of functional abstraction layers provided by the cloud computing environment shown in FIG. 6, in accordance with an embodiment of the present principles.

In an embodiment, one or more of the elements of system 200 are implemented in the cloud using a cloud configuration. For example, FIGS. 6-7 show various aspects of the present principles relating to cloud computing. Moreover, while WIFI is described as being used with respect to at least one element of system 200, any wireless technology can be used to implement any of the communicative elements of system 200. These and other variations of the elements of system 200 are readily determined by one of ordinary skill in the art given the teachings of the present principles provided herein, while maintaining the spirit of the present principles.

FIGS. 3-5 show an exemplary method 300 for generating a next location prediction for a set of customers, in accordance with an embodiment of the present principles.

At step 305, collect location data for the set of customers. For a given customer, the location data is a sequence of events minimally including a timestamp, a location tag (e.g., presence zone id, iBeacon id, geohash, and so forth) and a quasi-static user id (e.g., a Media Access Control (MAC) address, International Mobile Subscriber Identity (IMSI), International Mobile Station Equipment Identity (IMEI), and so forth). Of course, other information can also be used as location data, while maintaining the spirit of the present principles. In an embodiment, step 305 includes step 305A.

At step 305A, semantically enrich the location data with product information.

At step 310, determine transaction data for the set of customers. For a given customer, the transaction data is a sequence of events minimally including a timestamp, product type purchased and a quasi-static user id (that is joinable with the location data collected at step 305, e.g., through on-phone application). Of course, other information can also be used as transaction data, while maintaining the spirit of the present principles.

At step 315, collect mobile application interaction data for the set of customers. For example, the mobile application interaction data can correspond to interactions between the mobile device 299 of a customer 277 with respect to the store application 298 and/or the shopping incentive providing application 230.

At step 320, identify and/or predict customer intent, based on the mobile application data. In an embodiment, step 320 includes step 320A.

At step 320A, build a customer intent model based on the mobile application data. In an embodiment, a typical customer intent model produces a probability distribution over the set of items (products) that the customer is interested in.

At step 325, identify and/or predict a current store layout, based on the location data and the transaction data.

At step 330, cluster the transaction data and identify customers with similar preferences. Any clustering technique can be used including, but not limited to, k-means clustering, hierarchical bi-clustering, Support Vector Machine (SVM), and so forth.

At step 335 form ensemble models of a next location prediction for each cluster (that was formed at step 330). In an embodiment, given a store layout map, a distribution over products of interest is converted to a distribution over locations that the customer may be interested in visiting (during an in-store visit). For example, build a Markov chain or a frequent sequence mining over all the customers in a cluster. A typical next location prediction model will produce a probability distribution over a set of possible next locations. The most likely next location is the one with the largest probability mass. In an embodiment, the ensemble models can be formed from the location data (per step 305) and the clustered transaction data (per step 330). In an embodiment, the ensemble models are formed based on semantic labels determining during the enriching step (step 305A). The ensemble models can be used to generate next location predictions that are segregated and/or otherwise delineated based on weekend next location predictions versus weekday next location predictions. In this way, different customer behaviors as exhibited during the week versus weekend behavior can all be accounted for depending upon the implementation.

At step 340, identify outliers (in each cluster) with respect to the ensemble models and move the outliers to the closest matching cluster (the closest matching ensemble model).

At step 345, determine whether (i) a resource budget (e.g., CPU time) has been exceeded or (ii) convergence has occurred. If so, then terminate the method. Otherwise, return to step 335 and repeat steps 335-345. It is to be appreciated that a repeat of steps 335-345 can be performed to address any outliers in the clusters.

At step 350, generate a next location prediction for a particular customer in the set, based on the next location prediction model for the cluster corresponding to the particular customer. In this way, the next location prediction can be determined across all of the customers in a cluster, thus preserving the individual privacy of each customer.

In an embodiment, step 350 includes step 350A and/or step 350B.

At step 350A, generate a next location prediction for a particular customer using a weighted vote over the next location prediction model and the customer intent model. In an embodiment, the outputs of the next location prediction model and the customer intent model are represented as probability distributions over possible locations. For instance, consider the case in which the next location prediction model outputs the following probability distribution: (loc1: 0.8, loc2: 0.2), where loc1 and loc2 are two possible next locations; while the customer intent model identifies the following probability distribution: (loc1: 0.6, loc2: 0.2, loc3: 0.2), where loc1, loc2 and loc3 are three possible next locations. A weighted combined distributed can be computed as follows: (loc1: 0.8*x+0.6*(1-w), loc2: 0.2*w+0.2*(1-w), loc3: 0.2*(1-w)) for some weight w between 0 and 1. The weight w could be determined empirically during a model training phase in order to maximize the accuracy of the predicted next locations.

At step 350B, generate a next location prediction for a particular customer based on a past K model states of the next location prediction model for the cluster corresponding to the particular customer, where K is an integer.

At step 355, determine a confidence value for the next location prediction. The confidence value can be based on prior actions of, and/or prior predictions for, the particular customer.

At step 360, determine whether confidence value is above a threshold amount. If so, then continue to step 365. Otherwise, return to step 350 to generate a new prediction.

At step 365, perform an action based on the predicted next location.

In an embodiment, step 365 includes step 365A and/or step 365B.

At step 365A, direct a customer to an item determined to be of interest to the customer, based on the predicted next location of the customer. In an embodiment, items to which customers are directed are constrained to be within a threshold distance of the predicted next location of the user.

At step 365B, transmitting, to a mobile device carried by the particular user, a coupon for an item proximate to the predicted next location.

Further regarding step 365, of course other actions and/or other constraints can also be used. That is, any action directed to increasing sales, increasing opt-ins, optimizing operations, and so forth can be performed at step 365, while maintaining the spirit of the present principles.

Model formation/training can involve calculating and/or recalculating model coefficients and other model building/combining processes as readily appreciated by one of ordinary skill in the art given the teachings of the present principles provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and next location prediction 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method for next location prediction, comprising:
recognizing, by a facial recognition system, a plurality of users entering a retail store to transform facial features of the plurality of users into user identifiers;
clustering, by a hardware processor, the plurality of users recognized by the facial recognition system based on user transaction data and the user identifiers to form a set of clusters;
ensembling, by the hardware processor, the plurality of users within clusters in a set of clusters formed based on user transaction data, and building a next location prediction model for each of the clusters to form a next location prediction model ensemble by converting a probability distribution over products of interest into a probability distribution over locations the plurality of users in respective ones of the clusters are likely interested in visiting using a store layout, semantic labels, and a respective Markov chain built over the plurality of users in each of the respective ones of the clusters;
predicting, by the hardware processor, a next location of a particular user from the plurality of users in a same cluster based on a weighted vote performed over a combined distribution of next locations predicted by the next location prediction model ensemble for the cluster corresponding to the particular user and next locations predicted by a customer intent model; and
directing the particular user to an item determined to be of interest to the particular user, based on the predicted next location of the user,
wherein the cluster corresponding to the particular user comprises at least one other user from the plurality of users in addition to the particular user.

2. The method of claim 1, wherein the item has an in-store location within a threshold distance to the predicted next location of the particular user.

3. The method of claim 1, further comprising:
semantically enriching, by the hardware processor, user location data with product information for products located proximate to locations indicated by the user location data; and
displaying, on a display device, the product information to the user when the user is at the locations proximate to the products.

4. The method of claim 3, wherein the next location prediction model for each of the clusters is built based on semantic labels determined from said enriching step.

5. The method of claim 1, further comprising:
determining at least one store product of interest to the particular user and an in-store location of the at least one store product; and
directing the particular user to the at least one store product at the in-store location responsive to the particular user entering a store or becoming within a threshold distance of the at least one store product.

6. The method of claim 1, further comprising preserving an individual privacy of the plurality of users by combining user movement patterns across at least multiple ones of the plurality of users.

7. The method of claim 1, wherein user location data comprises a timestamp, a location identifier, and a user identifier.

8. The method of claim 1, wherein the user transaction data comprises a timestamp, a purchased product type, and a user identifier.

9. The method of claim 1, wherein the next location prediction model is configured to delineate weekend next location predictions versus weekday next location predictions.

10. The method of claim 1, wherein the next location prediction for the particular customer is based on past model states of the next location prediction model for the cluster corresponding to the particular customer.

11. The method of claim 1, transmitting, to a mobile device carried by the particular user, a coupon for an item proximate to the predicted next location.

12. The method of claim 1, further comprising protecting a privacy of a specific one of the plurality of users by generating the predicted next location of the user to be non-user-specific and cluster-specific.

13. The method of claim 1, wherein the customer intent model produces a probability distribution over a set of items that the particular user is interested in.

14. A computer program product for next location prediction, the computer program product comprising a non-transitory computer readable storage medium having program instructions embodied therewith, the program instructions executable by a computer to cause the computer to perform a method comprising:
recognizing, by a facial recognition system, a plurality of users entering a retail store to transform facial features of the plurality of users into user identifiers;
clustering, by a hardware processor, the plurality of users recognized by the facial recognition system based on user transaction data and the user identifiers to form a set of clusters;
ensembling, by the hardware processor, the plurality of users within clusters in a set of clusters formed based on user transaction data, and building a next location prediction model for each of the clusters to form a next location prediction model ensemble by converting a probability distribution over products of interest into a probability distribution over locations the plurality of users in respective ones of the clusters are likely interested in visiting using a store layout, semantic labels, and a respective Markov chain built over the plurality of users in each of the respective ones of the clusters;
predicting, by the hardware processor, a next location of a particular user from the plurality of users in a same cluster based on a weighted vote performed over a combined distribution of next locations predicted by the next location prediction model ensemble for the cluster corresponding to the particular user and next locations predicted by a customer intent model; and
directing the particular user to an item determined to be of interest to the particular user, based on the predicted next location of the user by the next location prediction model and a predicted next location by a customer intent model,
wherein the cluster corresponding to the particular user comprises at least one other user from the plurality of users in addition to the particular user.

15. A system for next location prediction, comprising:
a facial recognition system for recognizing a plurality of customers responsive to the plurality of users entering a retail store to transform facial features of the plurality of users into user identifiers; and
a hardware processor, configured to:
cluster the plurality of users recognized by the facial recognition system based on user transaction data and the user identifiers to form a set of clusters;
ensemble the plurality of users within clusters in a set of clusters formed based on user transaction data and building a next location prediction model for each of the clusters to form a next location prediction model ensemble by converting a probability distribution over products of interest into a probability distribution over locations the plurality of users in respective ones of the clusters are likely interested in visiting using a store layout, semantic labels, and a respective Markov chain built over the plurality of users in each of the respective ones of the clusters;
predicting, by the hardware processor, a next location of a particular user from the plurality of users in a same cluster based on a weighted vote performed over a combined distribution of next locations predicted by the next location prediction model ensemble for the cluster corresponding to the particular user and next locations predicted by a customer intent model; and
direct the particular user to an item determined to be of interest to the particular user, based on the predicted next location of the user by the next location prediction model and a predicted next location by a customer intent model,
wherein the cluster corresponding to the particular user comprises at least one other user from the plurality of users in addition to the particular user.

16. The system of claim 15, wherein the hardware processor is comprised in a server implemented using cloud technology.

* * * * *